(12) United States Patent
Rothkopf et al.

(10) Patent No.: US 8,556,659 B1
(45) Date of Patent: Oct. 15, 2013

(54) RECEPTACLE CONNECTOR WITH CIRCUITRY FOR DETERMINING THE CONFIGURATION OF A CORRESPONDING PLUG CONNECTOR MATED THEREWITH

(75) Inventors: Fletcher Rothkopf, Los Altos, CA (US); Mathias Schmidt, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/442,651

(22) Filed: Apr. 9, 2012

(51) Int. Cl.
*H01R 13/66* (2006.01)

(52) U.S. Cl.
USPC .................................................. 439/620.21

(58) Field of Classification Search
USPC ........ 439/620.21, 620.22, 638–639, 640, 455
See application file for complete search history.

(56) References Cited

U.S. PATENT DOCUMENTS

| | | | |
|---|---|---|---|
| 3,692,966 A * | 9/1972 | Lancaster | 200/51.1 |
| 4,140,918 A * | 2/1979 | Lancaster | 307/112 |
| 6,368,155 B1 * | 4/2002 | Bassler et al. | 439/620.21 |
| 7,392,946 B2 | 7/2008 | Hellström et al. | |
| 7,463,042 B2 | 12/2008 | Pereira | |
| 7,589,536 B2 | 9/2009 | Terlizzi et al. | |
| 7,731,526 B2 * | 6/2010 | Sato | 439/541.5 |
| 7,863,906 B2 | 1/2011 | Terlizzi et al. | |
| 7,890,284 B2 | 2/2011 | Patterson et al. | |
| 2003/0048759 A1 * | 3/2003 | Cara | 370/282 |
| 2004/0023560 A1 | 2/2004 | Swoboda | |
| 2006/0047982 A1 | 3/2006 | Lo et al. | |
| 2011/0012727 A1 | 1/2011 | Pance et al. | |
| 2011/0092100 A1 * | 4/2011 | Coffey et al. | 439/620.22 |
| 2013/0115817 A1 * | 5/2013 | Terlizzi et al. | 439/620.21 |
| 2013/0117470 A1 * | 5/2013 | Terlizzi et al. | 710/3 |

OTHER PUBLICATIONS

U.S. Appl. No. 61/478,805, filed Apr. 25, 2011, Shahoian et al.
U.S. Appl. No. 13/455,155, filed Apr. 24, 2012, Shahoian et al.

* cited by examiner

*Primary Examiner* — Chandrika Prasad
(74) *Attorney, Agent, or Firm* — Kilpatrick Townsend & Stockton LLP

(57) ABSTRACT

An electronic device having a housing and a receptacle connector. The receptacle connector includes an opening at an exterior surface of the housing. A plurality of contacts are arranged in a two dimensional array positioned within the opening of the receptacle connector. The receptacle connector is configured to concurrently mate with multiple plug connectors where each mated plug connector electrically connects to different and mutually exclusive subsets of contacts in the plurality of contacts. Switching circuitry is coupled to the plurality of contacts and configured to detect when one or more plug connectors are mated with the receptacle connector and electrically connect circuitry within the electronic device to contacts in the one or more plug connectors via subsets of contacts from the plurality of contacts.

21 Claims, 11 Drawing Sheets

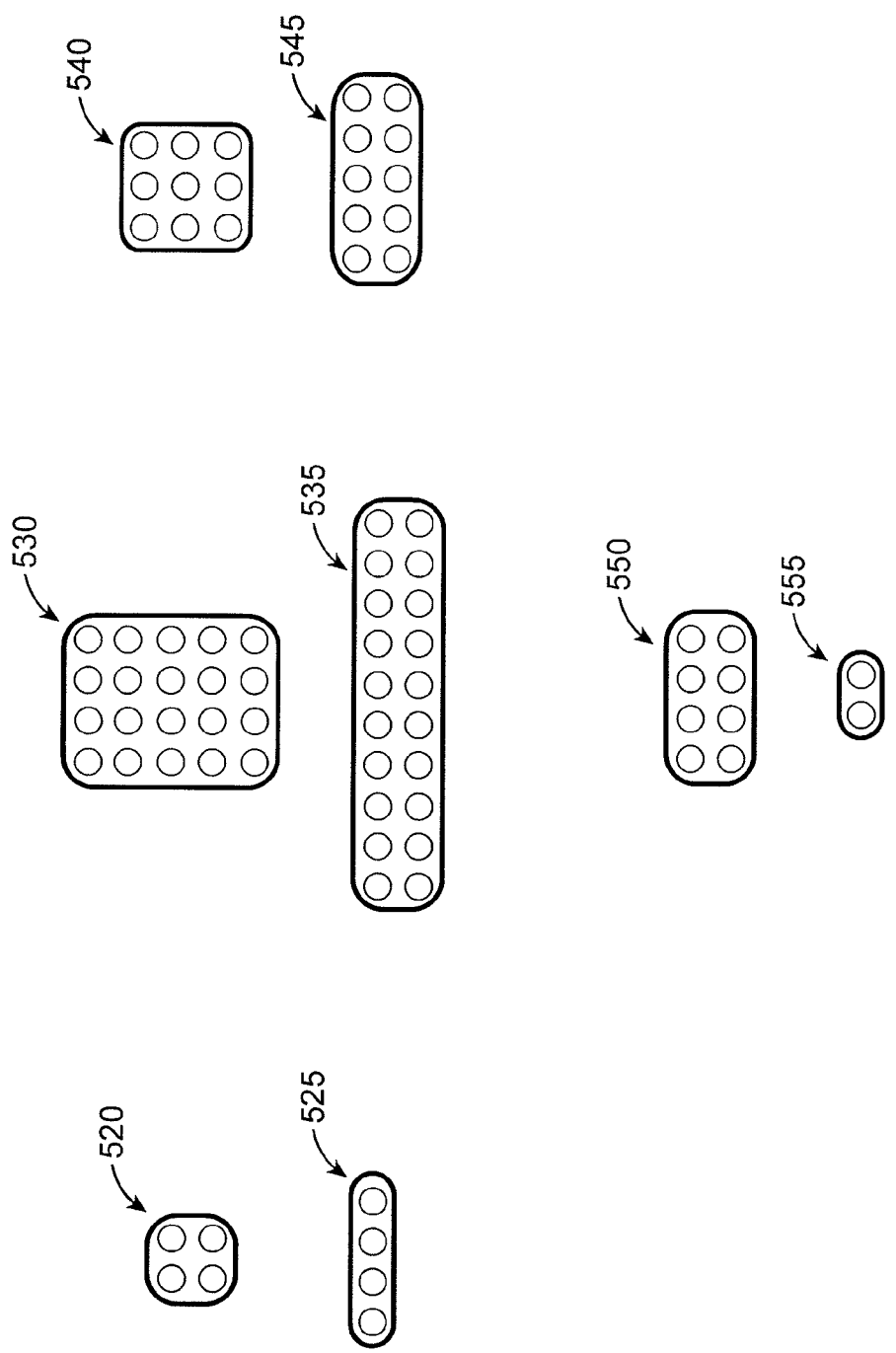

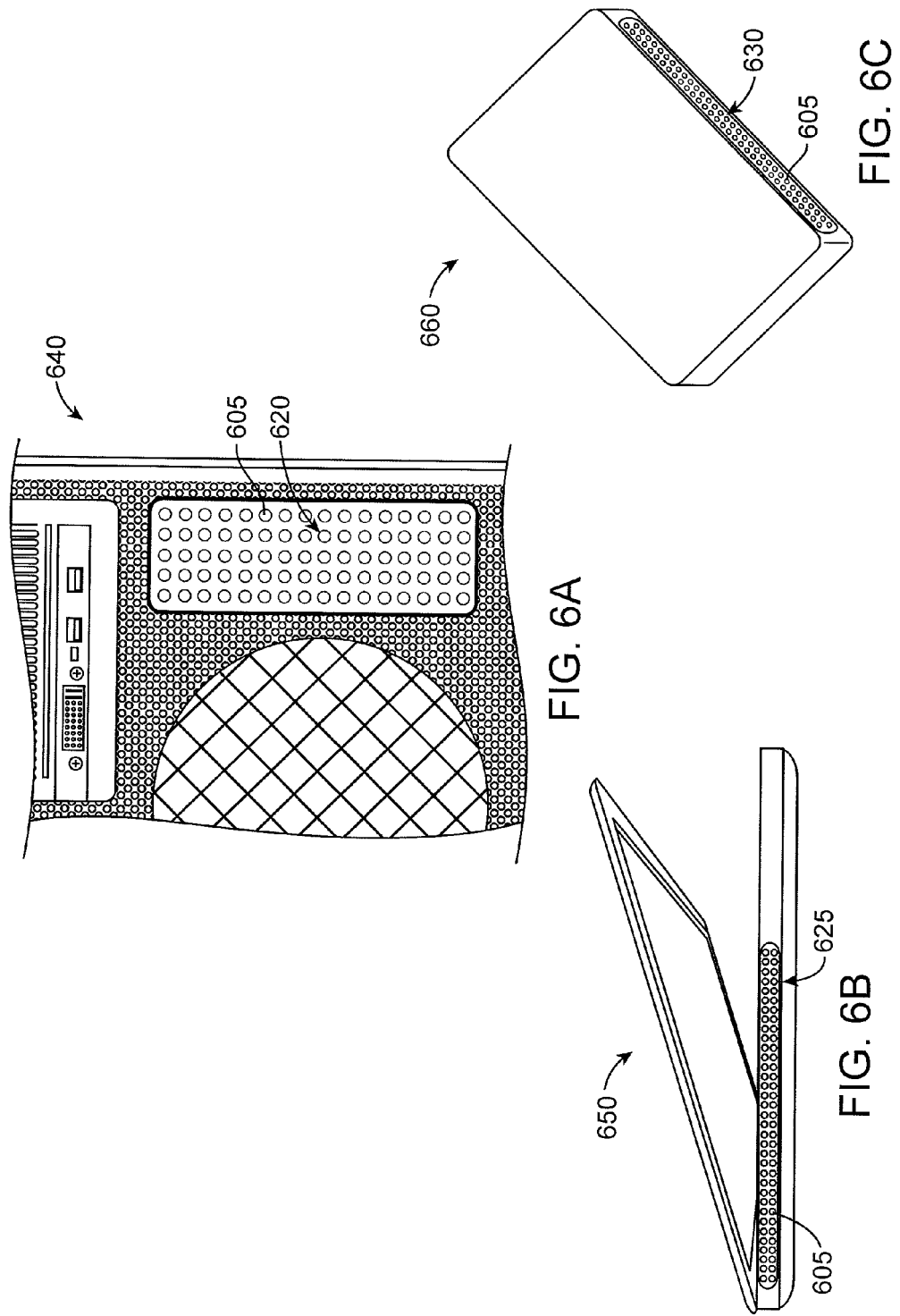

RECEPTACLE CONNECTOR WITH CIRCUITRY FOR DETERMINING THE CONFIGURATION OF A CORRESPONDING PLUG CONNECTOR MATED THEREWITH

BACKGROUND OF THE INVENTION

The number of types of electronic devices that are commercially available has increased tremendously the past few years, and the rate of introduction of these devices shows no signs of abating. Devices, such as tablet, laptop, netbook, desktop, and all-in-one computers; cell, smart, and media phones; storage devices, portable media players, navigation systems, monitors, and others, have become ubiquitous.

Often, these electronic devices communicate with other electronic devices. As just one example, a desktop computer may need to communicate with a monitor or display device. Such communications may take place over a cable. The cable may have plug connector on each end, where the plug connectors mate with receptacle connectors on the desktop and the monitor.

Currently, some electronic devices may include many connector receptacles. For example, a laptop computer may have connectors for Universal Serial Bus (USB), a High-Definition Multimedia Interface (HDMI), Digital Visual Interface (DVI), DisplayPort, Thunderbolt, FireWire, power, Ethernet, stereo audio and other types of interfaces.

Such diversity is not without its downside. The inclusion of so many connectors consumes space inside the electronic device, as well as the surface area of its outer case. This means that smaller devices may only be able to include a limited number of connectors. Also, different communication interfaces typically employ different connectors that cannot be mated with each other. For example, a plug connector for a USB interface cannot be mated with a receptacle connector for a FireWire interface. Furthermore, each set of corresponding connectors (male and female connectors of a particular interface that are designed to be mated with each other) can typically only be connected in one particular orientation. Attempts to mate corresponding connectors with each other in the wrong orientation will fail just as attempts to mate incompatible connectors with each other will fail. Customer confusion may result as users try to determine which receptacle connector on the computer or other electronic device a plug connector for a particular cable or accessory must be mated with as well as which orientation matching connectors much be connected together in.

BRIEF SUMMARY OF THE INVENTION

Various embodiments of the invention pertain to receptacle connectors that improve upon some or all of the above described deficiencies. Embodiments of the invention are not limited to receptacle connectors on computing devices and may be used for numerous other electronic devices. Some embodiments, however, are particularly well suited for computing devices. In view of the shortcomings in currently available receptacle connectors, some embodiments of the present invention relate to circuits, methods, and apparatuses for providing a scalable receptacle connector that may concurrently interface with one or more of a multiplicity of different plug connectors.

One particular embodiment of the invention pertains to an electronic device having a housing and a receptacle connector. The receptacle connector has an opening at an exterior surface of the housing. A plurality of contacts are arranged in a two dimensional array positioned within the opening of the receptacle connector. The receptacle connector is configured to concurrently mate with multiple plug connectors where each mated plug connector electrically connects to different and mutually exclusive subset of contacts in the plurality of contacts. Switching circuitry is coupled to the plurality of contacts and configured to detect when a first plug connector is mated with the receptacle connector and electrically connect circuitry within the electronic device to contacts in the first plug connector via a first subset of contacts from the plurality of contacts. The switching circuitry is also configured to detect when a second plug connector is mated with the receptacle connector and electrically connect circuitry within the electronic device to contacts in the second plug connector via a second subset of contacts from the plurality of contacts. The first and second subsets of contacts are mutually exclusive subsets.

In another embodiment, the invention pertains to a method of forming a connection between a plug connector having a first plurality of contacts and a receptacle connector having a second plurality of contacts greater in number than the first plurality. The method includes in response to the plug connector being physically connected to the receptacle connector, sensing one or more characteristics of the plug connector to determine a predicted mapping of a subset of contacts of the receptacle connector to correspond with the first plurality of contacts of the plug connector, wherein the predicted mapping identifies which contacts in the second plurality of contacts are included in the subset of contacts along with a function of each contact in the subset; electrically coupling at least one contact in the subset of contacts in the receptacle connector to a contact in the plug connector to form an electrical connection between the plug connector and receptacle connector; using the electrical connection between the plug connector and receptacle connector to verify whether the predicted mapping of the subset of contacts in the receptacle connector correctly matches the first plurality of contacts in the plug connector; and if the predicted mapping is correct, electrically coupling additional contacts in the subset of contacts in the receptacle connector with corresponding contacts in the receptacle connector according to the predicted mapping.

In still another embodiment, the invention pertains to a method of forming a connection between a plug connector and a receptacle connector capable of being connected with a plurality of different plug connectors having different contact arrangements. The method includes in response to a plug connector being physically connected to the receptacle connector, sensing one or more characteristics of the plug connector to determine an expected connector type, and an expected physical orientation and position of the plug connector with respect to the receptacle connector; electrically coupling a first subset of contacts in the plug connector to a corresponding subset of contacts in the receptacle connector to form an electrical connection between the plug connector and receptacle connector; using the electrical connection between the plug connector and receptacle connector to verify whether the expected connector type, expected position and expected physical orientation of the plug connector are correct; and if the expected connector type, expected position and expected physical orientation are confirmed, electrically coupling additional contacts in the plug connector with corresponding contacts in the receptacle connector.

Other embodiments of the invention pertain to an electronic device including a housing and a receptacle connector. The receptacle connector includes a two dimensional array of contacts and the receptacle connector is capable of being mated with a plurality of plug connectors having different contact arrangements where each plug connector includes fewer contacts than the receptacle connector. The electronic device also includes circuitry that, in response to a plug connector being physically connected to the receptacle connector: senses a characteristic of the plug connector to determine an expected connector type and an expected physical orientation and position of the plug connector with respect to the receptacle connector; electrically couples a first subset of contacts in the plug connector to a corresponding subset of contacts in the receptacle connector; uses the electrical connection between the at least one contact of the first subset and the corresponding subset to verify whether the expected connector type, expected position and expected physical orientation of the plug connector are correct; and if the expected connector type, expected position and expected physical orientation are confirmed, electrically coupling additional contacts in the plug connector with corresponding contacts in the receptacle connector.

BRIEF DESCRIPTION OF THE DRAWINGS

FIG. 5A illustrates front views of several exemplary plug connectors that may be used with embodiments of the present invention;

FIGS. 6A-6C illustrate receptacle connectors implemented on multiple computing systems according to embodiments of the present invention;

DETAILED DESCRIPTION OF THE INVENTION

Figure 1:
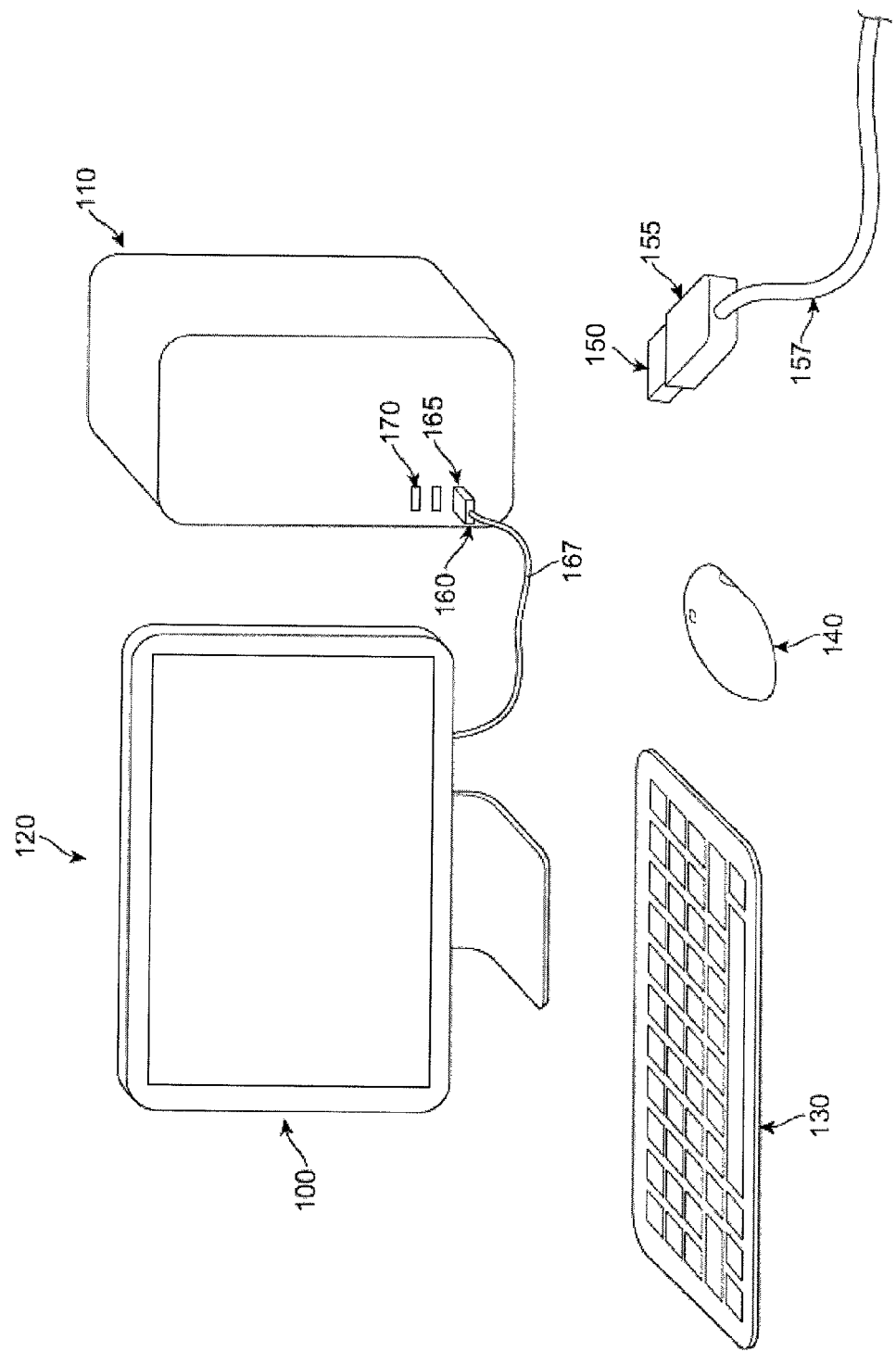
FIG. 1 illustrates a computer system that may be improved by the incorporation of embodiments of the present invention.

FIG. 1 illustrates a computer system 100 that may be improved by the incorporation of embodiments of the present invention. Computer system 100 may include a desktop computer 110, a monitor 120, a keyboard 130, and a mouse 140. It is to be understood, however, that computer system 100 is just one example of a system that may be improved by the incorporation of embodiments of the present invention. Embodiments of the invention may be used with other electronic devices, such as tablet, laptop, netbook, and all-in-one computers; cell, smart, and media phones; storage devices, portable media players, navigation systems and monitors among other electronic devices.

In this example desktop computer 110 may drive monitor 120 with signals provided over a cable 167. Cable 167 may include a plug connector 160, which may be inserted into a connector receptacle 165 located on desktop computer 110. A second plug connector 150 may also be inserted into desktop computer 110, for example at a connector receptacle 170. Plug connector 150 may be partially surrounded by a plug connector housing 155 and attached to a cable 157. Cable 157 may in turn be connected to another plug connector, which may in turn be connected to another device (not shown), such as a storage device, a media player, or other electronic device.

Connector receptacles, such as receptacle connectors 165 and 170, may receive and provide signals in compliance with various standards or interfaces, such as USB, HDMI, DVI, DisplayPort, Thunderbolt, FireWire 800, FireWire 400, power (low current and high current), Ethernet, stereo audio and the like. To support a large number of standards or interfaces, a correspondingly large number of receptacle connectors generally need to be included in desktop computer 110. These receptacle connectors may add expense, complexity, and size to desktop computer 110. This large number of connectors also degrades the aesthetics of desktop computer 110 or other electronic devices, and adds to customer confusion and dissatisfaction.

Accordingly, embodiments of the present invention provide receptacle connectors that are capable of simultaneously and/or concurrently accepting multiple different plug connectors that support a variety of interfaces and standards. In some specific embodiments, the receptacle connector may include a two dimensional array of equally spaced contacts that is sufficiently large enough to allow multiple plug connectors to be concurrently connected therewith. Switching circuitry (not shown in FIG. 1) within desktop computer 110 may be connected to the contacts of the receptacle connector and configured to provide the proper communication interface for each plug connector that is mated with receptacle connector as discussed below.

Figure 2:
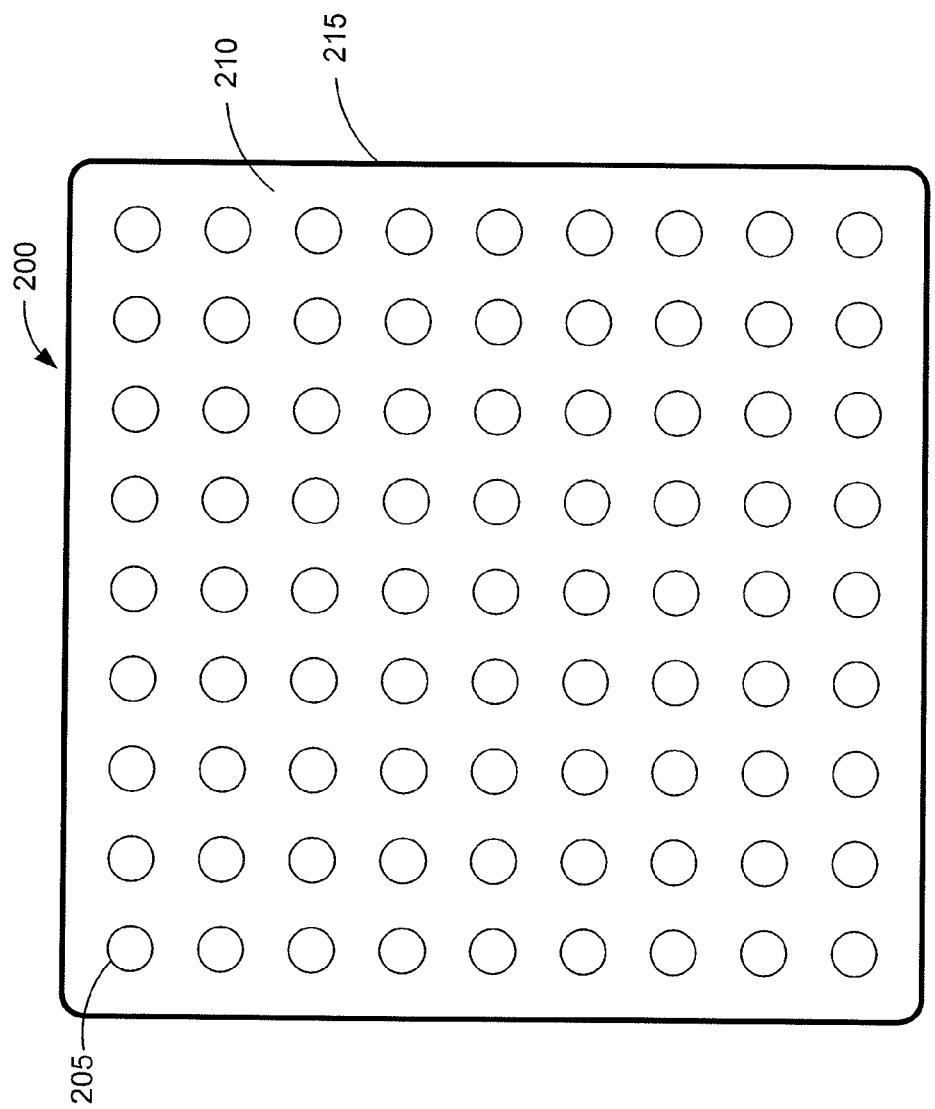
FIG. 2 illustrates a receptacle connector that includes an array of contacts located in an opening of a housing of the receptacle connector according to an embodiment of the present invention.
Figures 3A, 3B:
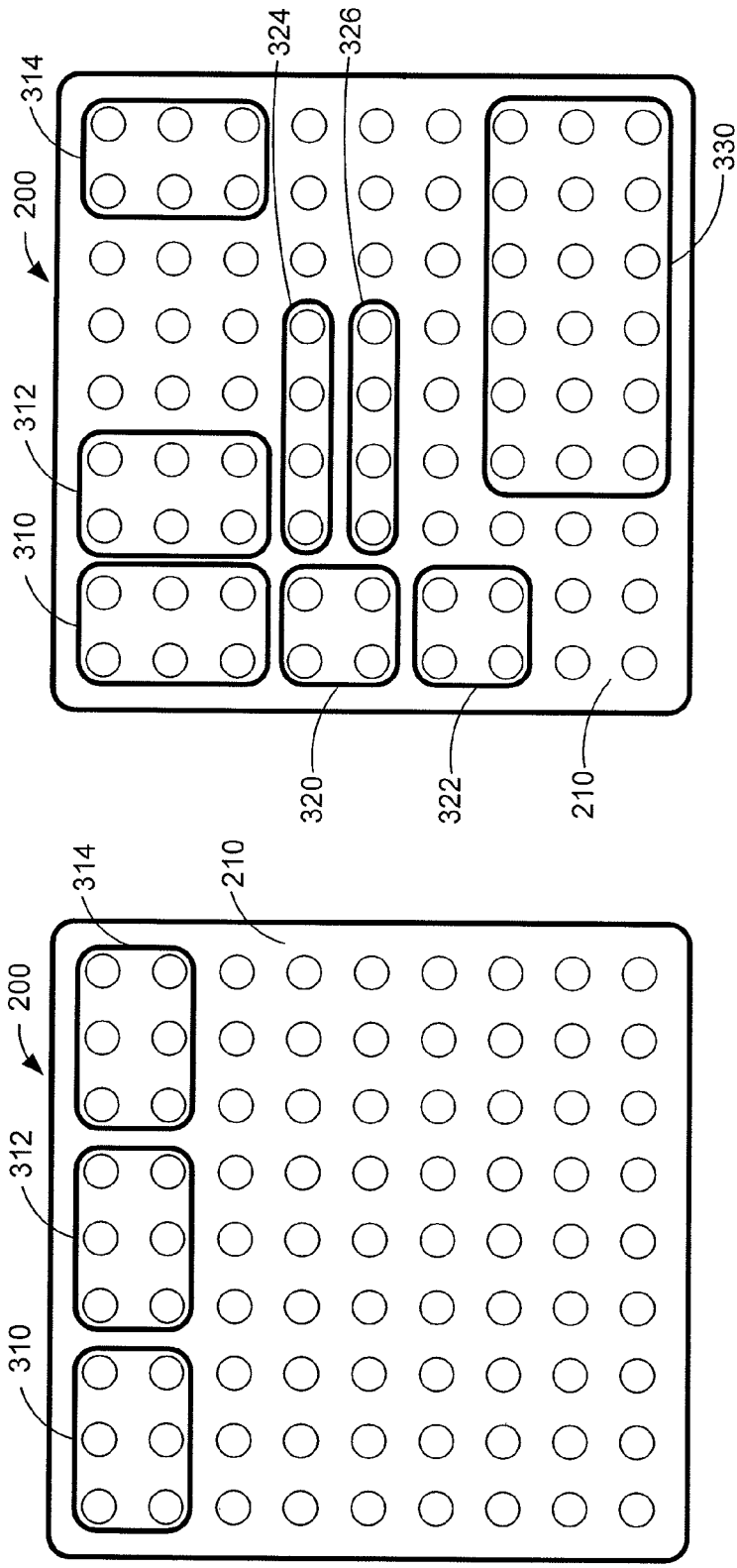
FIGS. 3A & 3B illustrate configurations in which multiple plug connectors are concurrently mated with a receptacle connector according to embodiments of the present invention.

FIG. 2 illustrates a receptacle connector 200 that includes an array of contacts 205 located in an opening (or cavity) 210 of a housing 215 of the receptacle connector according to one embodiment of the present invention. Receptacle connector 200 may be implemented on a number of different electronic devices, including those discussed above, and typically is attached to the electronic device such that opening 210 is at an exterior surface of the electronic device. As shown in FIG. 2, the array of contacts is a 9×9 square array that includes 81 equally spaced, identical contacts 205. The contact array allows multiple different plug connectors to be concurrently mated with receptacle connector 200. For example, FIG. 3A illustrates one configuration in which three 6-contact plug connectors 310, 312 and 314 (the outline of each of which is shown in the figure) are concurrently mated with receptacle connector 200. Each of the plug connectors 310, 312 and 314 can be for the same communication interface (e.g., a FireWire 400 interface) or can be for different interfaces. As shown, each of the individual plug connectors is inserted within cavity 210 and mated with a separate subset of contacts within the receptacle connector. Each subset has a number of contacts equal to the number of contacts in its mated plug connector. Thus, connecting the three 6-contact plug connectors 310, 312 and 314 to receptacle connector 200 requires three separate subsets of six contacts in the receptacle connector for a total of eighteen contacts. Also, each of the various subsets of contacts that are mated with a plug connector is mutually exclusive of the others. That is, each individual contact 205 within the contact array that is part of the subset of contacts mated to connector 310 cannot be part of a subset that is mated to any other plug connector as long as connector 310 remains coupled to receptacle connector 200.

As another example, FIG. 3B shows receptacle connector 200 mated with the same three 6-contact plug connectors 310, 312 and 314, along with four 4-contact plug connectors 320, 322, 324 and 326 and an 18-contact plug connector 330. In FIG. 3B, however, connectors 310, 312, and 314 are each inserted within cavity 210 and mated with receptacle connector 200 in a vertically aligned orientation as compared to the horizontally aligned orientation shown in FIG. 3A. As discussed in more detail below, the contact array, and its associated switches array, provides a tremendous amount of flexibility in the number and type of plug connectors that can be mated with receptacle connector 200 as well as the location and orientation in which each individual plug connector can be mated with the receptacle connector. Thus, the positions, orientations and types of plug connectors attached to receptacle connector 200 may be varied in many additional ways different than those illustrated in FIGS. 3A and 3B.

While contacts 205 are shown as having a circular cross-section in each of FIGS. 2, 3A and 3B, embodiments of the invention are not limited to any particular shape for the contacts. For example contacts 205 may have a rectangular cross-section, a triangular cross-section, an oblong cross-section, or any other appropriate shape. Additionally, in various embodiments, the diameter of contacts 805 may range from between about 0.01 inches to about 0.001 inches but embodiments of the invention are not limited to any particular sized contacts either. Also, in some embodiments contacts 205 of the receptacle connector may be male contacts that protrude outwards or while in other embodiments contacts 205 may be female contacts that define a hole into which individual contacts from a plug connector are inserted. The corresponding contacts on the plug connector may be male or female depending on the nature of the receptacle connector contacts.

Figure 4A:
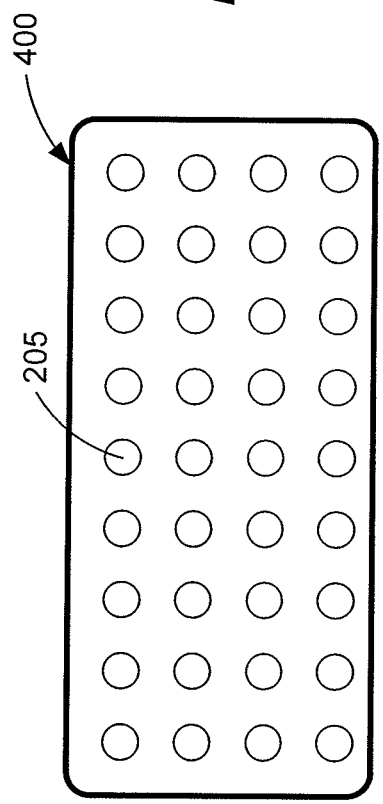
FIGS. 4A & 4B illustrate receptacle connectors according to embodiments of the present invention that include a 4×9 rectangular array of contacts and a 3×18 rectangular array of contacts, respectively.
Figure 4B:
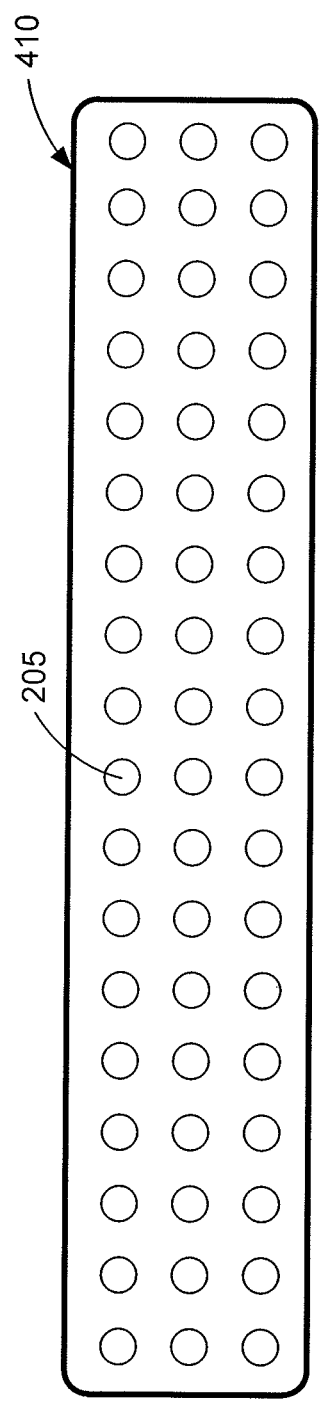

While the contact array shown in FIG. 2 is a square 9×9 array of 81 contacts, embodiments of the invention are not limited to any particular size or shape contact array. As two additional examples, FIG. 4A shows a receptacle connector 400 according to one embodiment of the invention that includes a 4×9 rectangular array of 36 contacts 205 while FIG. 4B shows a receptacle connector 410 that includes a 3×18 rectangular array of 54 contacts 205 according to another embodiment of the invention. Other embodiments may include a hundred or even more contacts arranged in different patterns.

Similarly, and as discussed above, many different types of plug connectors can be mated with a receptacle connector according to the present invention. FIG. 5A illustrates front views of several exemplary plug connectors that may be used with embodiments of the present invention. As shown in FIG. 5A, plug connectors 520 and 525 are each 4-contact plug connectors, such as USB connectors. Connector 520 has its contacts arranged in a 2×2 square pattern while connector 525 has its contacts arranged in a single row of four contacts. Similarly, plug connectors 530 and 535 are each 20-contact plug connectors, which as an example may be useful for Display Port connectors, with differently dimensioned contact arrays. Plug connectors 540 and 545 are examples of 9-contact and 10-contact connectors that can be particularly useful for FireWire 800 connectors, and plug connectors 550 and 555 are examples of 8-contact and 2-contact plug connectors that can be used, for example, for high current and low current power ports, respectively. The contacts arrangements of any of the aforementioned plug connectors may be varied in ways additional to those illustrated in FIG. 5. In various other embodiments, Ethernet, Stereo Audio, FireWire 400 and other types of connectors may be implemented according to embodiments of the present invention and each may be implemented with any number of different contact array schemes. Also, in various embodiments of the present invention an adapter may be used with a plug connector that is not compatible with receptacle connectors of the present invention. For example, an adapter may provide physical and electrical compatibility for a conventional USB, HDMI, DVI, DisplayPort, Thunderbolt, FireWire 800, FireWire 400, power, Ethernet, stereo audio or other types of connectors to allow them to connect with receptacle connectors according to the present invention.

Figure 5B:
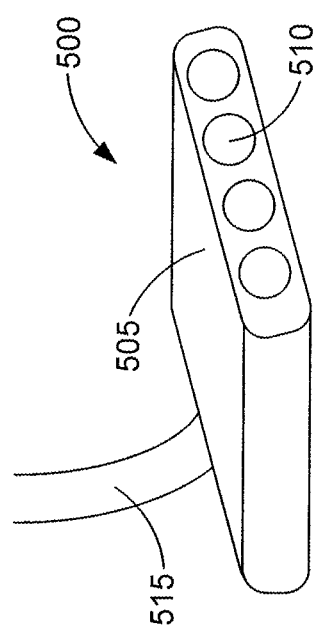
FIG. 5B illustrates a perspective view of one example of a plug connector that has four contacts arranged in a single row that may be used with embodiments of the present invention.

Typically, the contacts for each of the plug connectors shown in FIG. 5A are positioned within a housing. FIG. 5B illustrates one example of a plug connector 500 that has four contacts arranged in a single row similar to connector 525 shown in FIG. 5A. Plug connector 500 includes a housing 505, an array of contacts 510 that are connected to conductors (not shown) inside cable 515 and housing 505. In some embodiments of the invention plug connector 500 may include elements of a retention mechanism for holding plug connector 500 in the receptacle connector which may have corresponding retention mechanism elements. Housing 505 of the plug connector may have rounded edges that facilitate extraction of the plug connector from the receptacle connector using a non-axial force, that is, it may be non-binding. Plug connector 500 may have other shapes as well. Plug connector 500 may be inserted in opening 210 of receptacle connector 200 such that each of the four plug connector contacts 510 is physically coupled to a receptacle connector contact 205. Because of the shape and structure of plug connector 500, its four contacts 510 will couple to a subset of four contacts 205 that are adjacent to each other in a single row within receptacle connector 200. Plug connector 500 may be mated with receptacle connector 200 in any of four different orientations, including orientations aligned at: 0 degrees (side 505a up), 90 degrees (side 505a on the right), 180 degrees (side 505a down) or 270 degrees (side 505a on the left). Once connector 500 is physically coupled with connector 200, circuitry within connector 200 or its associated electronic device can correctly identify the connector type of connector 200 as well as its orientation and connection position within the array of contacts 205 and set switches to connect circuitry within the electronic device appropriate for connector 500 as discussed below. In various embodiments of the present invention, plug connector 500 and corresponding receptacle connector may include a self-wiping feature.

FIGS. 6A, 6B and 6C illustrate receptacle connectors 620, 625 and 630 implemented on computing systems 640, 650 and 660, respectively. A receptacle connector may be placed at any location on a computing system, including, for example, on one side of a computing system as shown FIGS. 6A-6C. The size and shape of the array of contacts 605 and the number of contacts implemented on a receptacle connector may vary based on any number of factors, including, for example, available or unused surface area on a computing system, user convenience in accessing the receptacle connector, and proximity to internal circuitry of the computing system. Computing system 640 may be a tower for a desktop computer. Computing system 650 may be a laptop. Computing system 660 may be a mobile computing device, e.g., a phone or tablet computer. Computing systems 640, 650 and 660 are just a few examples wherein embodiments according to the present invention may be implemented. In other embodiments, a receptacle connector may be implemented on a computer monitor, an all-in-one computer, e.g., an iMac, an accessory, or another electronic device. In yet additional embodiments, more than one receptacle connector according to the present invention may be included on a single electronic device. For example, separate receptacle connectors according to the invention could be located on two different sides of any of computing systems 640, 650 or 660.

As mentioned above, embodiments of the invention may include switching circuitry coupled to the individual contacts within the receptacle connector. The switching circuitry can be configured detect when a plug connector is mated with the receptacle connector 200, determine which subset of contacts in the receptacle connector are physically connected to the plug connector and electrically connect some or all of the contacts in the connector subset to circuitry within the computer associated with a particular communication interface or other function used by the mated plug connector.

When more than one plug connector is connected to receptacle connector 200, the contacts of each respective plug connector are in contact with different and mutually exclusive subsets of contacts 205 of receptacle connector 200. The switching circuitry may be configured to detect when the first plug connector is mated with plug connector 200 and electrically connect circuitry within the electronic device to the contacts of the first mated plug connector via a first subset of contacts 205 that are in contact with the contacts of the first plug connector. As additional plug connectors are mated with receptacle connector 200, the switching circuitry will detect each additional mating event and set internal connections to particular contacts within receptacle connector 200 as appropriate. For example, when a second plug connector is mated with receptacle connector 200, the switching circuitry may detect this mating event and electrically connect circuitry within the electronic device to the contacts of the second mated plug connector via a second subset of contacts 205 of receptacle connector 200 that are in contact with the contacts of the second plug connector.

In some embodiments of the invention, all of the contacts 205 of the receptacle connector that are not operatively coupled to a plug connector may be floated—i.e., there is no signal or power provided to the contacts. Thus, when no plug connectors are mated with receptacle connector 200 all of its contacts 205 may be in such a floated state. Such an arrangement provide a level of protection against unintentionally connecting contacts of a plug connector with contacts of a receptacle connector that should not have been made. Also, some plug connectors require their contacts to be connected with corresponding contacts on a receptacle connector according to a specific sequence. Accordingly, illustrative apparatuses and methods are outlined below to provide a receptacle connector having switching circuitry connected to contacts of the receptacle connector and configured to provide the proper communication interface for one or more plug connectors mated with receptacle connector.

Figure 7:
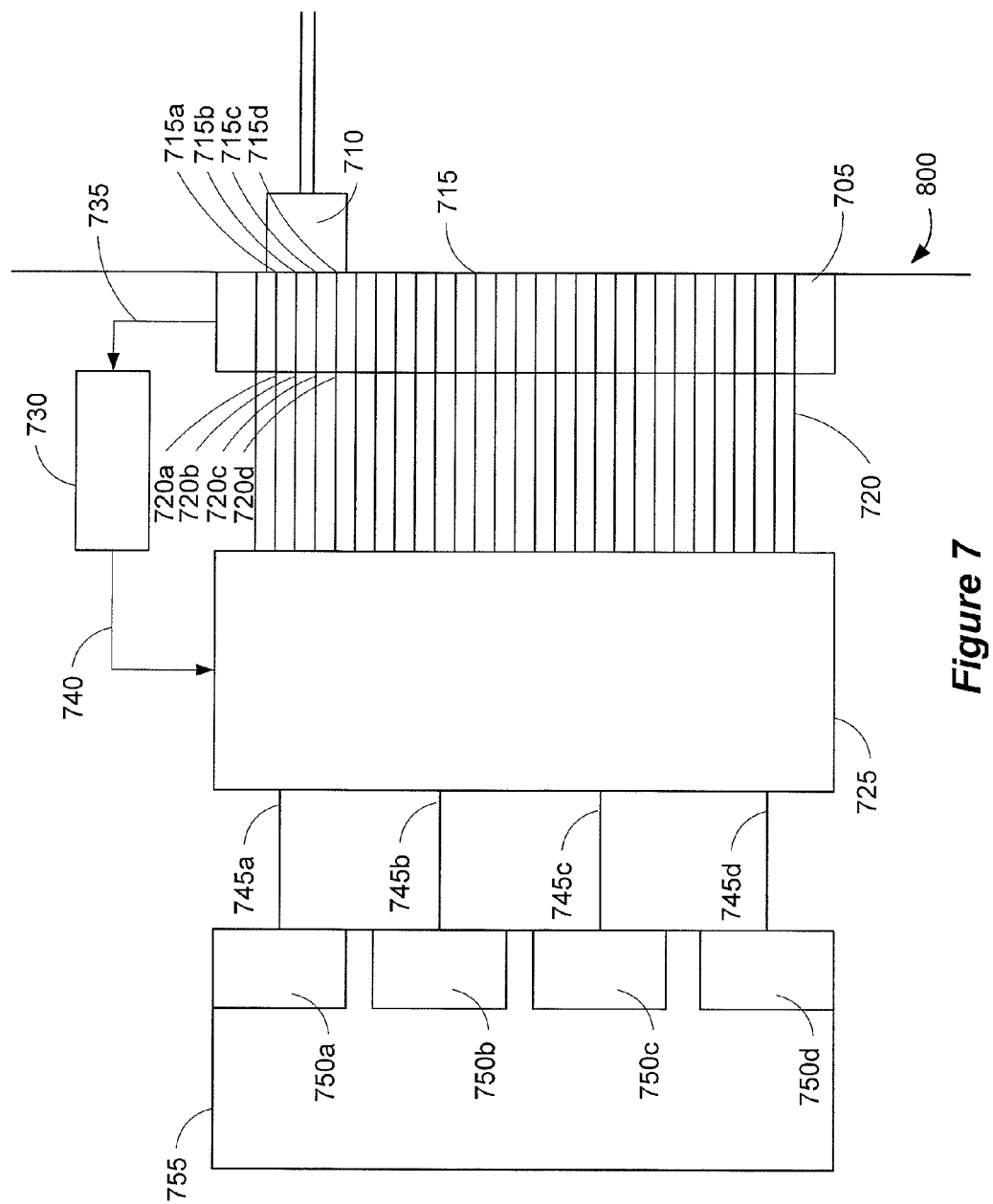
FIG. 7 illustrates embodiments of the present invention for electrically coupling contacts of a plug connector with internal circuitry of an electronic device via a receptacle connector.

FIG. 7 illustrates embodiments of the present invention for electrically coupling contacts of a 4-contact plug connector 710 with internal circuitry of an electronic device 700 via a receptacle connector 705. Receptacle connector 705 includes a plurality of contacts 715, each of which is coupled to a corresponding line 720. Switching circuitry 725 can connect each of the lines 720 to internal circuitry as discussed below. For the purposes of illustration, receptacle connector 705 may be similar to, for example, receptacle connector 200 shown in FIG. 2, while plug connector 710 may be similar to, for example, plug connector 500 in FIG. 5B. Also, contacts 715 may be similar to contacts 205.

As shown in FIG. 7, plug connector 710 may be mated with receptacle connector 705 such that one or more contacts 715 within the receptacle are physically connected to the contacts (not shown in FIG. 7) of plug connector 710. Since plug connector 710 is a 4-contact connector in this example, when connector 710 is mated with receptacle connector 705 four receptacle connector contacts 715a-715d are in physical contact with corresponding contacts in the receptacle connector. Each of contacts 715a-715d is connected to switching circuitry 725 via a corresponding line 720a-720d. One or more sensors (not shown in FIG. 7, but illustrative examples are outlined below) disposed on receptacle connector 705 sense characteristics, i.e., measure characteristic values, of plug connector 710 according to methods and configurations discussed herein. Information including the sensed characteristics and any determinations may be communicated by sensors disposed on receptacle connector 705 to route configuration circuitry 730 via line 735.

Route configuration circuitry 730 analyzes the information including the sensed characteristics to determine the type, position and orientation of plug connector 710 according to methods and configurations outlined herein. This information may be partially or wholly relied on to determine a mapping that identifies which contacts of receptacle connector 705 are in contact with which contacts of plug connector 710 and the expected function of each of the contacts of plug connector 710. Route instructions are communicated to switching circuitry 725 via line 740 according to the determined mapping of contacts. These instructions direct switching circuitry 725 to route lines between the subset of contacts one or more contacts of plug connector 710 and the appropriate internal circuitry inside electronic device 700, i.e., to electrically couple the contacts of plug connector 710 to appropriate internal circuitry via contacts 715a-715d, lines 720a-720d, switching circuitry 725 and one or more lines 745. Route configuration circuitry 730 may perform the determination steps of Method 900 discussed below (e.g., steps 915, 940 and 965) or the sensors may perform this function and then send these determinations to route configuration circuitry 730 for further analysis.

Lines 745 connect switching circuitry 725 to internal circuitry located on a motherboard or logic board 755. Examples of such internal circuitry include circuitry 750a that implements a desired communication interface (e.g., a USB interface, a FireWire interface, a Thunderbolt interface, etc.), an audio codec 750b, a video processor 750c, and a network processor 750d or any other appropriate circuitry within device 700 including power circuitry. As an example, if plug connector 710 is a USB connector, route configuration circuitry 730 may determine, based wholly or partially on information received from sensors (not shown in FIG. 7) on receptacle connector 705 via line 735, that switching circuitry 725 should route lines 720a-720d to line 745a in order to couple plug connector 710 with USB circuitry 750a.

Switching circuitry 725 may include mechanical switches (e.g., relays) or electrical switches (e.g., transistors) for routing lines. In some embodiments, both mechanical switches and electrical switches may be implemented, including implementing more than one switch and/or switch type per contact of the receptacle connector. These embodiments may be especially useful where a receptacle connector does not include a column or row of contacts dedicated to a specific purpose, e.g., power, and all contacts can perform any function performed by other contacts. The transistors may be used where a contact carries lower current and relays may be used where a contact carries higher current. In some embodiments, it may be advantageous to implement mechanical switches for some contacts and electrical switches for other contacts. For example, where certain rows, columns or other groupings of contacts of a receptacle connector are dedicated power contacts (e.g., the illustrative examples outlined below), mechanical switches could be used for these contacts while transistors could be used for the other contacts (e.g., including signal contacts). The advantage of transistors may be that they are space efficient and would work for small contacts (e.g., a receptacle with hundreds of small contacts). In other embodiments, switching circuitry may include multiplexors alone or in combination with the other switches previously discussed. In various embodiments of the present invention, this switching circuitry may operate in a number of ways, including illustrative methods as outlined below.

Figure 8:
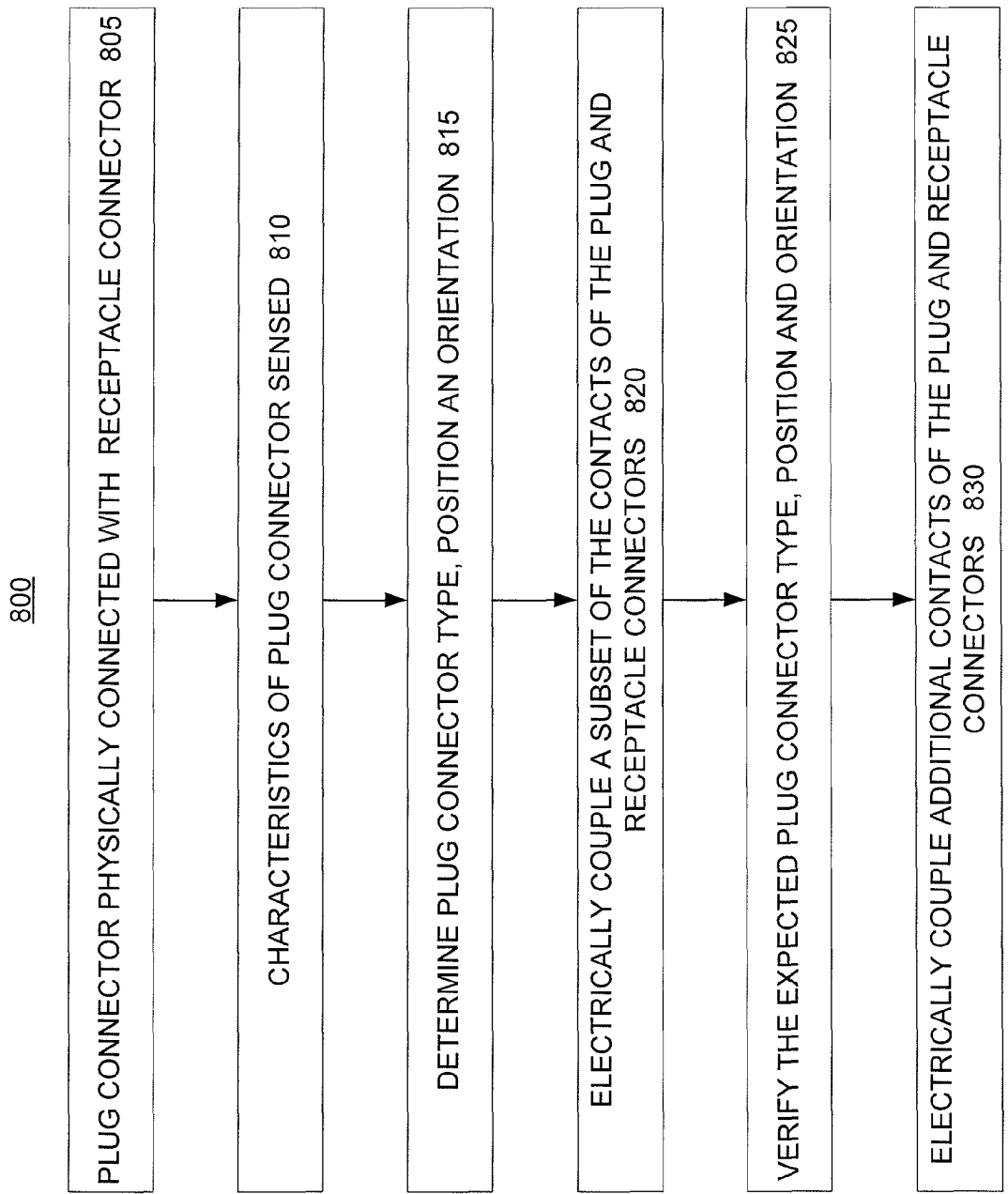
FIG. 8 illustrates a method of forming an electrical connection between one or more plug connectors and a receptacle connector in accordance with principles of the present invention.

In various embodiments of the present invention, the apparatus of FIG. 7 may function in a number of ways, including according to illustrative methods as outlined below. FIG. 8 illustrates a Method 800 of forming an electrical connection between one or more plug connectors and a receptacle connector in accordance with principles of the present invention. As discussed above, embodiments of the receptacle connector are capable of being concurrently connected with a plurality of different plug connectors having different contact arrangements, including illustrative examples as outlined herein.

At step 805, a plug connector is physically connected with a receptacle connector. In various embodiments of the present invention, the plug connector may maintain physical contact with the receptacle connector by means of a retention mechanism, e.g., a mechanical, electrical or magnetic mechanism that holds the plug connector and the receptacle connector in physical contact with each other. In some embodiments of the present invention, the presence of a plug connector may be detected when two or more contacts of a receptacle connector are connected to each other through a contact on the plug connector. In still other embodiments, the connector receptacle may detect whether a plug connector is physically connected by a number of ways, including a mechanical detection mechanism, e.g., a contact may be deflected when a plug connector is connected with a receptacle connector or sensors discussed herein may be used to detect a mating event. Even after the plug connector and receptacle connector are mated, the contacts of the receptacle connector remain floating until further determinations can be made.

At step 810, a characteristic of the plug connector is sensed. Several different characteristics may be sensed in several ways, including illustrative methods as outlined herein. In various embodiment of the present invention, one or more characteristics of the plug connector may be sensed at step 810. For example, electrical sensors may sense electrical characteristics, e.g., the resistance or voltage between two contacts, of a plug connector. As another example, optical sensors such as camera may sense visual indictors, e.g., symbols or markings, on a plug connector. Additional examples are outlined below. The sensing of the one or more characteristic may be sequential or simultaneous. In some embodiments, there may one or more additional steps that occur after one characteristic is sensed and before one or more additional characteristics are sensed.

At step 815, the plug connector type as well as orientation and position with respect to the receptacle connector are determined. Using the sensed characteristic or characteristics, the determination of the plug connector type, position and orientation may be accomplished in several ways, including illustrative methods as outlined below. The plug connector types refers to the communication interfaces or standards supported by the plug connector, e.g., USB, HDMI, DVI, DisplayPort, Thunderbolt, FireWire 800, FireWire 400, power (low current and high current), Ethernet, stereo audio or other interface. The plug connector position refers to which contacts of the receptacle connector are in contact with contacts of a plug connector. The plug connector orientation refers to the orientation of the plug connector with respect to the receptacle connector, e.g., right-side-up or up-side-down, and the like.

At step 820, a subset of contacts in the plug connector are electrically coupled with a corresponding subset of contacts in the receptacle connector. Although the contacts may have been physically connected at step 805, the electrical coupling of the contacts may be reserved for step 820 in order to prevent damage, malfunction, or other incident that may occur if contacts are electrically coupled that were not intended to be coupled. As mentioned earlier, prior to this step all the contacts of the receptacle connector may be floating and subsequent to this step some contacts may still remain floating. In various embodiments, the subsets of contacts to be electrically coupled may be determined in response to the determined plug connector type, position and orientation. Furthermore, the electrical coupling may occur by means of switching circuitry in several ways, including illustrative methods as illustrated below. The switching circuitry may couple one or more plug connector contacts to internal circuitry of the electronic device via receptacle connector contacts to which plug connector contacts are physically connected.

At step 825, the determined plug connector type, position and orientation are verified—the determined plug connector type, position and orientation may also be referred to as the expected plug connector type, position and orientation. In various embodiments, the verification may be accomplished in a number of ways, including illustrative methods as illustrated below. For example, a handshaking or other authentication, identification, or validation method may be used to confirm the expected plug connector type, position and orientation.

At step 830, assuming expected plug connector type, position and orientation were confirmed, additional contacts, e.g., the rest of the contacts, of the plug connector may be electrically coupled with the corresponding contacts in the receptacle connector.

In some embodiments, Method 800 may be repeated when additional plug connectors are physically connected with the receptacle connector. In this manner, a multiplicity of plug connectors may concurrently form a connection with a receptacle connector. The electrical coupling of the receptacle connector with a first plug connector is not affected by the electrical coupling of the receptacle connector with a second plug connector. The number of additional plug connectors that may simultaneously form a connection with the receptacle connector may be limited by the number of unused or available contacts on the receptacle connector or the contact arrangement of additional plug connectors relative to the unused or available contacts on the receptacle connector. Thus, the steps of Method 800 may be repeated until there are not enough unused contacts in the receptacle connector for an additional plug connector to be connected therewith.

Figure 9:
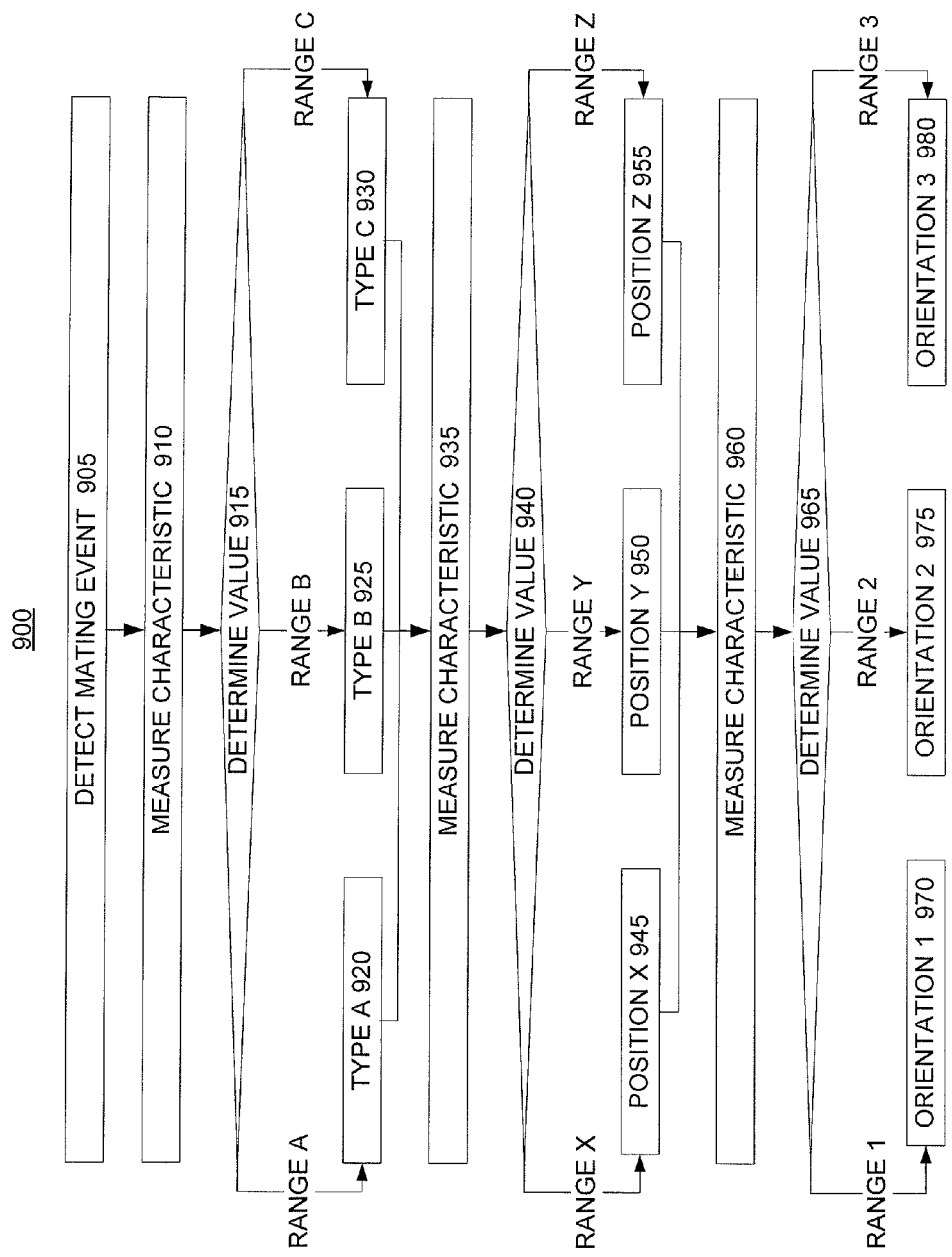
FIG. 9 illustrates a method of measuring electrical characteristics of a plug connector physically connected to a receptacle connector with electrical sensors in order to determine the plug connector type, position and orientation in accordance with principles of the present invention.

FIG. 9 illustrates a Method 900 of measuring electrical characteristics of a plug connector physically connected to a receptacle connector with electrical sensors in order to determine the plug connector type, position and orientation in accordance with principles of the present invention. In some embodiments, Method 900 is an embodiment of steps 810 and 815 of Method 800. Although FIG. 9 is directed at determining plug connector type, position and orientation, the same steps can be repeated to make other determinations based on electrical or other characteristics Additionally, sensors other than electrical sensors may also may be used to make determinations about a plug connector type, position and orientation, as outlined in illustrative examples below.

In step 905, the connecting of a plug connector with a receptacle connector is sensed by the receptacle connector—a mating event is detected. Again, in some embodiments of the present invention, the presence of a plug connector may be detected when two or more contacts of a receptacle connector are connected to each other through a contact on the plug connector. In still other embodiments, the connector receptacle may detect whether a plug connector is physically connected by a number of ways, including a mechanical detection mechanism, e.g., a contact may be deflected when a plug connector is connected with a receptacle connector. In various other embodiments of the present invention, optical, magnetic, radio frequency and other sensors may also be implemented to accomplish the determination of step 905, which may be accomplished according to variations of illustrative methods as outlined below.

In step 910, an electrical characteristic of one or more contacts of a plug connector or the plug connector itself may be sensed to determine the type of plug connector mated with the receptacle connector. This step may occur in response to the detection of a mating event that occurred in step 905. Electrical sensors may be used to measure electrical characteristics, including resistive, reactive, current, voltage and/or others and can involve one or more contacts and/or the whole plug connector. In one embodiment, the measurement can be of the voltage of one contact with respect to another contact. In an alternative embodiment, the measurement can be of the resistance between two contacts. Other embodiments may poll the electrical characteristics of one or more contacts of the plug connector and/or the plug connector in different manners. The measured electrical characteristics may, for example, be a value associated with a resistive, reactive, current, voltage and/or other characteristics. This sensed or measured value may be compared against a range of expected values for different types of plug connectors as described in step 915.

In step 915, the value measured at step 910 is compared with a multiplicity of ranges to determine which range the measured value falls within. If the measured value is within Range A, Method 900 can proceed to step 920. Step 920 represents a determination that the mated plug connector is plug connector A. If the measurement is within Range B, Method 900 can proceed to step 925. If the measurement is within Range C, Method 900 can proceed to step 930. Each different range, e.g., Ranges A-C, may correspond to a range of measured values that would be expected for a specific plug connector type. The number of different branches of process 900 following step 915; e.g., steps 920, 925 and 930 corresponding to Ranges A-C; can be defined by at least the number of plug connector types that can communicate with the electronic device of the receptacle connector, e.g., the plug connector types identified herein. Step 915 may be performed by the electrical sensor or by route configuration circuitry, as described below.

In one embodiment, process 900 can repeat step 910 if a value measured at step 910 does not fall into any of the predetermined ranges (e.g., Ranges A-C above). In another embodiment, Method 900 can resolve that same situation by prompting a user to check the connection between the plug connector and the connector receptacle or allow the user to manually select the plug connector type, e.g., the user may select the plug connector type via a user interface of the electronic device of the receptacle connector.

In some embodiments, additional steps are not required where the measurement taken at step 910 is able to determine enough information about the plug connector to determine plug connector type as well as position and orientation.

In step 935, another electrical characteristic of one or more contacts of the plug connector or the plug connector itself may be sensed to determine the orientation of a plug connector mated with the receptacle connector. Sensors and methods of sensing electrical characteristics described above with regards to step 910 may be applied to step 935 as well.

Step 940 depends on the measured value obtained at step 935 and/or at step 910 in some embodiments. If the measured value is within Range X, Method 900 can proceed to step 945. Step 945 represents a determination that the mated plug connector is in Position X. If the measurement is within Range Y, Method 900 can continue with step 950. If the measurement is within Range Z, Method 900 can continue with step 955. Each different range, e.g., Ranges X-Z, may correspond to a range of measured values at specific groups of contacts that may indicate an expected plug connector position, e.g., Positions X-Z. The number of different branches of process 900 following step 940, e.g., steps 945-955 corresponding to Ranges X-Z, can be defined by at least the number of positions in which a plug connector can be mated with the receptacle connector.

In step 960, yet another electrical characteristic of one or more contacts of the plug connector or the plug connector itself may be sensed to determine the orientation of a plug connector mated with the receptacle connector. Sensors and methods of sensing electrical characteristics described above with regards to step 910 may be applied to step 960 as well.

Step 965 depends on the measured value obtained at step 960 and/or at steps 910 and 935 in some embodiments. If the measured value is within Range 1, Method 900 can proceed to step 970. Step 970 represents a determination that the mated plug connector is in Orientation 1. If the measurement is within Range Y, Method 900 can continue with step 975. If the measurement is within Range Z, Method 900 can continue with step 960. Each different range, e.g., Ranges 1-3, may correspond to a range of values measured at the contacts that may indicate an expected plug connector position, e.g., as right-side-up or up-side-down or other. The number of different branches of process 900 following step 965, e.g., steps 970-980 corresponding to Orientations 1-3, can be defined by at least the number of orientations in which a plug connector can be mated with the receptacle connector.

In some embodiments, Method 900 may be repeated until sufficient information is known about a mated plug connector to determine its type, position and orientation. Non-electrical and/or multiple electrical and non-electrical sensors may be implemented to measure characteristics of a plug connector. It is contemplated that individual sensors and/or collective sensors may narrow down the possible plug connector variables; e.g., type, position, and orientation; until a final determination can be made. Then, one or more sensors may proceed in parallel or series to measure characteristics and determine plug connector variables for another plug connector.

In other embodiments of the present invention, once the plug connector type, position and orientation are determined, contacts in the plug connector may be electrically coupled with corresponding contacts in the receptacle connector. At that point, steps may be taken to verify or confirm that the determined variables were correctly determined. For example, information may be communicated at the connection interface to ensure that communication is properly functioning, as discussed below in Method 900.

Further examples and discussion of sensing electrical characteristics of contacts to determine plug connector type can be found in commonly owned U.S. Pat. Nos. 7,589,536, filed Jan. 5, 2007, titled Systems and Methods for Determining the Configuration of Electronic Connections; and 7,863,906, filed Jul. 2, 2009, titled Systems and Methods for Determining the Configuration of Electronic Connections which are incorporated by reference.

In some embodiments of the present invention, the presence of a plug connector may be detected when two or more contacts of a receptacle connector are connected to each other through a contact on the plug connector. For example, when a plug connector is inserted into the connector receptacle, various ones of the connector receptacle contacts may be shorted by contacts on the plug connector. By identifying which connector receptacle contacts are connected to each other, the position of a plug connector may be determined. In some situations where a type of plug connector has a unique pattern, the identity of a type of plug connector may be deduced from the position of the plug connector. An example of the operation of such a connector receptacle is outlined in commonly owned U.S. provisional patent application No. 61/478, 805, filed Apr. 25, 2011, titled Universal Connector, which is incorporated by reference.

As discussed earlier, in yet additional embodiments, the connector receptacle may detect whether a plug connector is physically connected by a number of other ways, including a mechanical detection mechanism, e.g., a contact may be deflected when a plug connector is connected with a receptacle connector, or by other sensors as discussed below.

As discussed above with regard to Method 900, non-electrical sensors or a combination of electrical sensors and non-electrical sensors may also be used to sense characteristics of plug connectors in order to determine the type, position, orientation, and/or other information regarding a mated plug connector. These determinations may be made by the sensors, circuitry associated with the sensors, and/or the route configuration circuitry. Following these determinations, power and/or signal may be provided to the contacts of the plug connector via the contacts of the receptacle connector. Accordingly, one or more non-electrical sensors may be configured to sense and measure one or more characteristics associated with a plug connector, including visible symbol or image, color, magnetic field, electrical field, frequency, sound, charge, pressure, displacement, and/or other. Optical, magnetic, radio frequency, pressure, and/or other sensors may be implemented in embodiments of the present invention to sense these characteristics according to illustrative examples as outlined below.

In some embodiments, one or more optical sensors, e.g., camera or diode, may be implemented to determine the type, position, orientation, and/or other information regarding a mated plug connector. For example, cameras may be used as part of one or more optical sensors disposed on a receptacle connector, e.g., between the contacts of a receptacle connector. One or more symbols or other visual indicators indicative of the type and/or orientation of a plug connector may be printed or otherwise disposed on the plug connector. The one or more optical sensors may also include circuitry for optical symbol recognition to determine the connector type and orientation of a mated plug connector based on the symbol or other visual indicators viewed by the camera. For example, the one or more optical sensors may be able to determine plug connector type from a visual indicator on the plug connector and the orientation of a plug connector with respect to the receptacle connector based on the orientation of the visual indicator. Lights, e.g., infrared lights, may be disposed on the connector receptacle to illuminate, or otherwise make visible to the one or more cameras on the receptacle connector, the symbol or visual indicator on the plug connector.

The symbols or visual indicators disposed on the plug connector may be shapes of specific colors or may be more complex designs. In some embodiments there may be one or more colored or non-colored shape or shapes above each contact indicating the purpose of each contact, from which the plug connector type, position and orientation may be determined. Alternatively, bar codes could be disposed on the plug connector and bar code scanners could be used as optical sensors disposed on the receptacle connector side. In these embodiments, the position of the bar code with respect to the other contacts could indicate the orientation of the connector.

In embodiments where the optical sensors discussed above are unable to determine the position of a plug connector mated with a receptacle connector, i.e., which contacts of the plug connector are in contact with which contacts of the receptacle connector, an optical sensor may be placed at multiple locations, e.g., between contacts of a connector receptacle, to determine the position of a mated plug connector. By evaluating which optical sensor or sensors on the receptacle connector sense the mated plug connector, the exact position of the plug connector may be determined.

In other embodiments, one or more magnetic sensors may be implemented to determine the type, position, orientation, and/or other information regarding a mated plug connector. For example, a Hall effect sensor may be used as part of one or more magnetic sensors disposed on a receptacle connector, e.g., between the contacts of a receptacle connector. The Hall effect sensor disposed on the receptacle connector may sense the magnetic field produced by a corresponding plug connector. Each plug connector type may include a magnetic element or elements such that the plug connector produces a magnetic signature—a magnetic field unique to a plug connector type or types—that may be sensed by the Hall effect sensor. The magnetic sensor may also include circuitry to determine plug connector type based on the magnetic signature sensed by the Hall effect sensor.

In embodiments where the magnetic sensor discussed above is unable to determine the orientation and/or position of a plug connector mated with a receptacle connector, a magnetic sensor may be placed at multiple positions on the receptacle connector, e.g., between the contacts of the connector receptacle, to determine the orientation and position of a mated plug connector. The sensing of a magnetic field, or the sensing of a magnetic field above a certain threshold, by these magnetic sensors may be used to determine the position of a plug connector with respect to the receptacle connector. The magnetic sensor may determine that the contacts of a plug connector are in contact with a specific group of contacts of the receptacle connector by means of Hall effect sensors positioned near the specific group of contacts of a connector receptacle that sense a magnetic field at or above a predetermined threshold level. The specific magnetic field values sensed by an individual Hall effect sensor near the mated contacts may also provide enough information to allow the magnetic sensor to determine the orientation of the plug connector, e.g., the magnetic signature of a plug connector may be a magnetic field that varies across the face the of the plug connector to indicate orientation.

In additional embodiments, radio frequency (RF) sensors, e.g., radio-frequency identification (RFID) or near field communication (NFC), may be implemented to determine the type, position, orientation, and/or other information regarding a mated plug connector. For example, a two-way radio transmitter-receiver, e.g., interrogators or readers, may be disposed on a connector receptacle and one or more RFID tags could be disposed on the plug connector. The RFID tags may send a response including the plug connector's type when queried by the two-way radio-transmitter-receiver disposed on the receptacle connector. The RFID tags may send responses when the plug connector is mated with or proximate to the receptacle connector. Other sensors may be relied upon to detect mating events and determine the plug connector position and orientation with respect to the receptacle connector.

Again, one or more RF sensors may be used in combination with other sensors, e.g., electrical sensors or other sensors discussed herein. The combination of these sensors may be able to determine sufficient information about a mated plug connector to appropriately couple the contacts of the plug connector and the receptacle connector.

In yet additional embodiments, one or more identification (ID) contacts may be implemented to determine the type, position, orientation, and/or other information regarding a mated plug connector. For example, one or more dedicated rows or columns of ID contacts may be implemented in a contact array of a receptacle connector and one or more corresponding ID contacts may be implemented on a plug connector. The one or more ID contacts of a plug connector may be polled by the one or more ID contacts of the receptacle connector to determine a mated plug connector's type. In some embodiments, the plug connector may have two ID contacts with a given electrical resistance between them that is associated with a specific plug connector type. These ID contacts may be polled to determine the resistance value between them and then that value may be used to determine the plug connector's type. The position of the one or more rows or columns of ID contacts within the array of contacts of the receptacle connector may be such that the position and orientation of the plug connector can be inferred after the plug connector type is determined by means of the ID contacts.

The ID contacts may be used in combination with sensors, e.g., electrical sensors or other sensors discussed herein. The combination of these sensors may be able to determine sufficient information about a mated plug connector to appropriately couple the contacts of the plug connector and the receptacle connector.

In other embodiments, contacts may be equipped with pressure transducers to sense pressure exerted on the contacts. When a plug connector is mated with a receptacle connector, the plug connector may exert pressure on the contacts of the receptacle connector. Thus, pressure transducers, i.e., pressure sensors, could determine the position of the plug connector by identifying which contacts have pressure exerted on them. Depending on whether the position of the plug connector indicates that the connected plug connector has a contact array pattern unique to a specific plug connector type, the plug connector type and even orientation may be inferred from the position information.

Accordingly, one or more sensors and the corresponding methods for determining plug connector type, position and orientation discussed above may be used in place of or in combination with the electrical sensors referred to in the steps of Method 900. In some embodiments, the steps of sensing different characteristics of the plug connector may operate in series as shown in FIG. 9 or they may operate in parallel—multiple sensors operating concurrently to determine characteristics of the plug connector. In other embodiments, the sensors may be able to sense characteristics of a plug connector before it is mated with a receptacle as opposed to sensing characteristics after mating, as in Method 900. As discussed above, the sensors themselves and/or the route configuration circuitry discussed with regard to FIG. 7 may perform the determinations of plug connector type, position and orientation.

Figure 10:
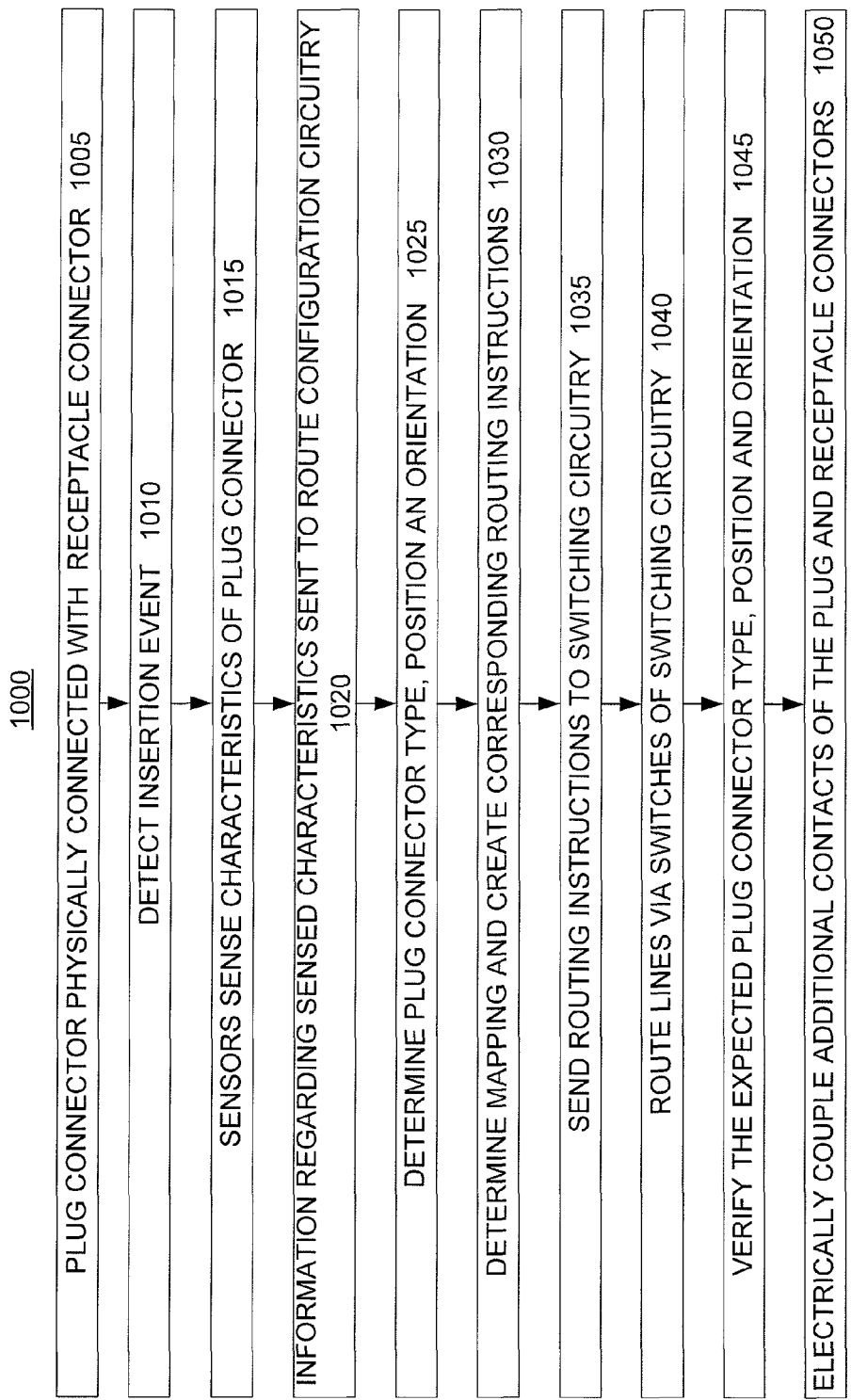
FIG. 10 illustrates a method for electrically coupling contacts of a plug connector with internal circuitry of an electronic device via a receptacle connector according to an embodiment of the present invention.

FIG. 10 illustrates Method 1000 for electrically coupling contacts of a plug connector with internal circuitry of an electronic device via a receptacle connector. Method 1000 is a more detailed discussion of Method 800 that incorporates the steps of Method 900 in some embodiments. This figure, as with the other included figures, is shown for illustrative purposes and does not limit either the possible embodiments of the present invention or the claims.

At step 1005, a plug connector is inserted into a connector receptacle. All contacts of the receptacle connector may be floating prior to this insertion event and continue to be floating until a later step in Method 1000, e.g., step 1040.

At step 1010, the insertion event is detected by the receptacle connector. In various embodiments of the present invention, this detection may be determined in a number of ways, including illustrative methods as outlined above.

At step 1015, sensors disposed on the receptacle connector may sense characteristics of the plug connector. In various embodiments of the present invention, a number of different sensors may be used to sense characteristics of the plug connector, e.g., the illustrative sensors and corresponding methods as outlined above. In some embodiments, these sensors may include additional circuitry to determine the plug connector type, position, and/or orientation based on the sensed characteristics.

At step 1020, one or more sensors disposed on the receptacle connector relay information regarding sensed characteristics to the route configuration circuitry. The information may be relayed over a wired or wireless connection. In some embodiments, there may be a real-time feedback loop between the route configuration circuitry and the sensors, allowing information and even commands to be continuously communicated. In other embodiments, information may be relayed at a discrete point in time when the sensors have completed sensing characteristics of a plug connector.

At step 1025, the information received from the sensors is used by the route configuration circuitry to determine the type, position and orientation of the inserted plug connector, i.e., the expected plug connector type, position and orientation. In various embodiments of the present invention, step 1025 may be accomplished in a number of ways, including illustrative methods as outlined above. In some embodiments, as discussed above, the sensors may include circuitry configured to use the sense characteristics to determine the type, position and orientation of the mated plug connected, bypassing step 1025.

At step 1030, the determinations of step 1025 may be used by the route configuration circuitry to determine a mapping—the function and position of all contacts of the plug connector mated with the receptacle connector—and create corresponding routing instructions. The routing instructions may direct the switching circuitry to route lines extending from the contacts of the receptacle connector in contact with the plug connector to lines that extent to the appropriate internal circuitry.

At step 1035, the routing instruction may be sent by the route configuration circuitry to the switching circuitry. Step 1035 may be accomplished with a wired or wireless connection and may be a real-time feedback communication loop or a discrete communication.

At step 1040, the switching circuitry routes lines between a subset of the plug connector contacts and the appropriate internal circuitry in accordance with the received routing instructions, thereby electrically coupling the plug connector to the internal circuitry via the receptacle connector. Only a subset of the contacts of the plug connector is coupled electrically coupled to internal circuitry at step 1040 because adverse consequences could result from incorrect routing instructions. In some embodiments, the subset of plug connector contacts chosen for coupling may be data contacts through which test communications may be performed between the internal circuitry and the plug connector to verify the connection. In some embodiments, all the contacts of the plug connector are electrically coupled to corresponding circuitry at step 1040.

At step 1045, the electrical coupling of the contacts of the plug connector and the internal circuitry is verified to make sure the contacts have been correctly coupled. In some embodiments, this is performed by the internal circuitry sending communication over the coupled contacts. Depending on whether a response is received or whether the appropriate response is received, the internal circuitry may verify the coupling, i.e., verify the expected plug connector type, position, and orientation. If the coupling is not verified all contacts are uncoupled and Method 1000 may restart at step 1015. In some embodiments, handshaking or other authentication, identification, or validation methods may be used to verify the connection. In situations where the expected plug connector type, position and orientation are not verified, Method 1000 may restart at step 1015 and repeat steps 1015-1045 until the connection is verified.

At step 1050, assuming the connection was verified at step 1035, additional contacts of the plug connector are coupled to the corresponding internal circuitry according to the routing instructions. For example, all uncoupled contacts of the plug connector are coupled to internal circuitry according to the routing instructions. Some plug connectors may require their contacts to be connected to corresponding contacts on a receptacle connector according to a specific sequence. This may also be accomplished at step 1050 by uncoupling all contacts of the plug connector and then coupling all the contacts of the plug connector according to the specific sequence required for a particular plug connector type. Sequence requirements for a plug connector may be identified at an earlier step, e.g., step 1030.

At the conclusion of step 1050, the connection interface between the plug connector and receptacle connector may be fully operational. Method 1000 may be repeated to connect additional plug connectors to the receptacle connector without affecting the coupling of the first plug connector, thus allowing multiple plug connectors to concurrently connect to the receptacle connector and communicate with the appropriate internal circuitry.

In some embodiments of the present invention, the steps of Method 1000 may be performed in various orders or sequences, with steps added or omitted. For example, one or more characteristics of the plug connector may be sensed before the plug connector is physically connected with the receptacle connector. This may be accomplished using any of the sensors described above that are able to sense characteristics of a plug connector before it has actually been mated with the receptacle connector. This step may replace steps of Method 1000 that sense characteristics of the plug connector or may work in combination with steps of Method 1000 that sense characteristics of the plug connector.

In other embodiments of the present invention, the plug receptacle may receive information from a user about a plug connector that is or will be mated with the receptacle connector. For example, the user may provide an input at the electronic device on which the receptacle connector is implemented. This input may include information about the type, position, and/or orientation of a plug connector that is or will be mated with the receptacle connector. This information may be sufficient for the receptacle connector to appropriately couple the plug connector with the corresponding internal circuitry. Alternatively, the information received from the user may be used in combination with or serve as a substitute for information determined at the route configuration circuitry in coupling the plug connector with corresponding internal circuitry. For example, the route configuration circuitry may, for example, determine the type and position of a plug connector via sensors, but may request further information from a user regarding the orientation of a plug connector at a user interface of the electronic device on which the receptacle connector is implemented. The determinations of the route configuration circuitry in combination with the information provided by the user may be sufficient to appropriately couple the plug connector to corresponding internal circuitry. These steps may replace steps of Method 1000 that sense characteristics of the plug connector or may work in combination with steps of Method 1000 that sense characteristics of the plug connector.

In yet additional embodiments of the present invention, one plug connector contact may be in contact with more than one receptacle connector contact when the connectors are mated. This may be implemented in embodiments where the contacts of the receptacle connector have strong signal integrity, but only carry a low current. If contacts of the plug connector require high current, this may be provided by gaining a group of contacts of the receptacle connector together to collectively carry high current. This would allow for a robust design wherein all the contact of the receptacle connector are multipurpose, i.e., equally capable of serving as signal contacts or power contacts, but also versatile enough to provide low current or high current depending on the power requirements of the plug connector. For example, one contact of the plug connector may be in contact with two contacts or eight contacts of the receptacle connector when mated in order to provide low current or high current, respectively. In other embodiments, each contact of the plug connector may always be in contact with, for example, eight contacts when mated, but only a subset of the eight contacts may be activated if the plug connector requires less current. Alternatively, the plug connector may have multiple power contacts, e.g., eight power contacts for high current plug connectors or two power contacts for low current plug connectors. By gaining the contacts of the plug connector, a single contact of the plug connector would not need to be connected to multiple receptacle connector contacts to accommodate a high current requirement plug connector.

The above description of embodiments of the invention has been presented for the purposes of illustration and description. It is not intended to be exhaustive or limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
a housing;
a receptacle connector having an opening at an exterior surface of the housing and a plurality of contacts arranged in a two dimensional array positioned within the opening, the receptacle connector configured to concurrently mate with multiple plug connectors where each mated plug connector electrically connects to different and mutually exclusive subset of contacts in the plurality of contacts;
switching circuitry coupled to the plurality of contacts and configured to: (i) detect when a first plug connector is mated with the receptacle connector and electrically connect circuitry within the electronic device to contacts in the first plug connector via a first subset of contacts from the plurality of contacts, and (ii) detect when a second plug connector is mated with the receptacle connector and electrically connect circuitry within the electronic device to contacts in the second plug connector via a second subset of contacts from the plurality of contacts, wherein the first and second subsets of contacts are mutually exclusive subsets.

2. The electronic device of claim 1 wherein the circuitry is further configured to electrically isolate all contacts from the plurality of contacts that are not electrically connected to a plug connector from communications circuitry within the electronic device.

3. The electronic device of claim 1 wherein the two dimensional array includes m rows of n contacts where m is at least 2 and n is at least 6.

4. The electronic device of claim 3 wherein m is at least 4 and n is at least 10.

5. A method of forming a connection between a plug connector having a first plurality of contacts and a receptacle connector having a second plurality of contacts greater in number than the first plurality, the method comprising:
in response to the plug connector being physically connected to the receptacle connector, sensing one or more characteristics of the plug connector to determine a predicted mapping of a subset of contacts of the receptacle connector to correspond with the first plurality of contacts of the plug connector, wherein the predicted mapping identifies which contacts in the second plurality of contacts are included in the subset of contacts along with a function of each contact in the subset;
electrically coupling at least one contact in the subset of contacts in the receptacle connector to a contact in the plug connector to form an electrical connection between the plug connector and receptacle connector;
using the electrical connection between the plug connector and receptacle connector to verify whether the predicted mapping of the subset of contacts in the receptacle connector correctly matches the first plurality of contacts in the plug connector; and
if the predicted mapping is correct, electrically coupling additional contacts in the subset of contacts in the receptacle connector with corresponding contacts in the receptacle connector according to the predicted mapping.

6. The method of claim 5 wherein the sensed characteristics are used to determine an expected connector type and an expected physical orientation and position of the plug connector with respect to the receptacle connector.

7. The method of claim 5 wherein the first plurality of contacts is at least ten times more than the second plurality of contacts.

8. The method of claim 5 wherein the second plurality of contacts is at one hundred contacts.

9. The method of claim 5 wherein the receptacle connector is capable of being connected with a plurality of different plug connectors having different contact arrangements.

10. The method of claim 5 wherein the contacts of the receptacle connector are pins located within a cavity of the receptacle connector and extend perpendicular towards an opening of the cavity.

11. A method of forming a connection between a plug connector and a receptacle connector capable of being connected with a plurality of different plug connectors having different contact arrangements, the method comprising:
in response to a plug connector being physically connected to the receptacle connector, sensing one or more characteristics of the plug connector to determine an expected connector type, and an expected physical orientation and position of the plug connector with respect to the receptacle connector;
electrically coupling a first subset of contacts in the plug connector to a corresponding subset of contacts in the receptacle connector to form an electrical connection between the plug connector and receptacle connector;
using the electrical connection between the plug connector and receptacle connector to verify whether the expected connector type, expected position and expected physical orientation of the plug connector are correct; and
if the expected connector type, expected position and expected physical orientation are confirmed, electrically coupling additional contacts in the plug connector with corresponding contacts in the receptacle connector.

12. The method of claim 11 wherein electrically coupling the first subset includes switching internal electrical lines to the corresponding subset of contacts to configure the first subset based on the expected connector type, expected position and expected physical orientation.

13. The method of claim 11 wherein electrically coupling the additional contacts includes switching internal electrical lines to the additional contacts to configure the additional contacts based on the expected connector type, expected position and expected physical orientation.

14. The method of claim 11 further comprising connecting a second plug connector to a second subset of contacts within the receptacle connector while the first plug connector is mated with a first subset of contacts in the receptacle connector.

15. The method of claim 11, wherein the sensing is provided by at least one of the following group: an electrical sensor, a two-way radio transmitter-receiver, a magnetic sensor, and an optical sensor.

16. The method of claim 11, wherein the first subset includes one contact.

17. The method of claim 11, wherein the first subset includes at least one contact and less than all of the contacts of the plug connector.

18. The method of claim 11, further comprising decoupling the first subset of contacts from the corresponding subset of contacts if the expected connector type, expected position and expected physical orientation are not confirmed.

19. An electronic device comprising:
a housing;

a receptacle connector having a two dimensional array of contacts, the receptacle connector capable of being mated with a plurality of plug connectors having different contact arrangements where each plug connector includes fewer contacts than the receptacle connector;

circuitry that, in response to a plug connector being physically connected to the receptacle connector:

senses a characteristic of the plug connector to determine an expected connector type and an expected physical orientation and position of the plug connector with respect to the receptacle connector;

electrically couples a first subset of contacts in the plug connector to a corresponding subset of contacts in the receptacle connector;

uses the electrical connection between the at least one contact of the first subset and the corresponding subset to verify whether the expected connector type, expected position and expected physical orientation of the plug connector are correct; and if the expected connector type, expected position and expected physical orientation are confirmed, electrically coupling additional contacts in the plug connector with corresponding contacts in the receptacle connector.

20. The electronic device of claim 19, wherein the contacts of the receptacle connector are pins located within cavity of the receptacle connector and extending perpendicular towards an opening of the cavity.

21. The electronic device of claim 19, wherein the receptacle connector includes at least one hundred contacts.

* * * * *